United States Patent [19]

Meredith

[11] Patent Number: 5,730,655

[45] Date of Patent: *Mar. 24, 1998

[54] FISHING ROD AND REEL ELECTRONIC GAME CONTROLLER

[76] Inventor: Chris Meredith, NPP #42, Old South Rd., Nantucket, Mass. 02554

[*] Notice: The term of this patent shall not extend beyond the expiration date of Pat. No. 5,542,672.

[21] Appl. No.: 718,043

[22] Filed: Aug. 2, 1996

Related U.S. Application Data

[63] Continuation of Ser. No. 406,064, Mar. 17, 1995, Pat. No. 5,542,672.

[51] Int. Cl.⁶ .................. A63F 9/22; A01K 97/00
[52] U.S. Cl. .................. 463/37; 43/4; 463/7; 463/46; 273/148 B
[58] Field of Search .................. 273/148 B; 463/36, 463/7, 46, 37; 43/1, 4, 18.1, 17; 345/156, 157

[56] References Cited

U.S. PATENT DOCUMENTS

| | | |
|---|---|---|
| 4,630,817 | 12/1986 | Buckley. |
| 4,695,953 | 9/1987 | Blair et al.. |
| 4,925,189 | 5/1990 | Braenning. |
| 5,131,165 | 7/1992 | Benson. |
| 5,157,381 | 10/1992 | Chenks. |
| 5,203,563 | 4/1993 | Loper, III .................. 273/148 B |
| 5,232,223 | 8/1993 | Dornbusch. |
| 5,317,336 | 5/1994 | Hall. |
| 5,362,069 | 11/1994 | Hall-Tipping .................. 463/7 |
| 5,368,484 | 11/1994 | Copperman et al. .................. 273/148 B X |
| 5,542,672 | 8/1996 | Meredith .................. 463/37 |

Primary Examiner—Raleigh W. Chiu
Attorney, Agent, or Firm—Weingram & Associates, P.C.

[57] ABSTRACT

An electronic controller is provided for controlling fishing simulation computer games. The controller includes a rod handle, a reel housing attached to the rod handle, and a rod shaft pivotally mounted within the reel housing and extending therefrom. The reel housing contains a motor to operate a gyroscope which is also positioned within the reel housing. A plurality of switches to transmit information to the computer game are provided on the reel housing. A reel crank handle extends from the reel housing and includes a break for applying resistance to the reel handle. A rod shaft pivoting apparatus that includes magnets and that act on metal plates attached to the rod shaft to pivotally move the rod shaft. The controller further includes communication cables that interconnect with a computer for transmitting information between the computer and the controller.

9 Claims, 3 Drawing Sheets

FISHING ROD AND REEL ELECTRONIC GAME CONTROLLER

This application is a continuation of U.S. Ser. No. 08/406,064 filed Mar. 17, 1995 now U.S. Pat. No. 5,542,672.

BACKGROUND OF THE INVENTION

1. Field of the Invention

The present invention relates to an electronic game controller for use with a video game, and more particularly, to a controller for controlling the operation of various fishing games played on a computer. The controller resembles an actual rod and reel and permits the user to interact with the computer game. Forces are applied to the rod and reel simulating forces that are applied to an actual rod and reel during fishing.

2. Description of the Prior Art

Many electronic video and computer games utilize electronic game controllers to control the action and movements of the game. The standard controller is typically configured as a mouse or a joystick and usually contains a number of push buttons and/or other controls for controlling various aspects of a game. These controllers do not, however, provide feedback to the player in terms of exerting forces on the player.

In response to the demand for realistic game controllers, many controllers have been developed to simulate actual real-life events, such as flying an airplane, driving a car, firing a gun, riding a bicycle, driving a golf ball, throwing a punch, or even fishing. These electronic game controllers have been fabricated in the shape of the actual equipment used in the activity simulated by the game. Some examples of these interactive electronic game controllers are shaped as guns, rifles, boxing gloves, baseball bats, airplane yokes, and steering wheels.

The following previous patents disclose electronic game controllers:

Cheng, U.S. Pat. No. 5,157,381, discloses a peripheral device for use with a computer to enable a user to interact with information displayed on a display device associated with a computer. The mouse comprises three selectable switches. The middle button is designed with a different shape and configuration than the two outside buttons and is raised above the surface level of the left and right button.

Buckley, U.S. Pat. No. 4,630,817, discloses a recreation apparatus in the form of an exercise bicycle which allows for operation of a video game displayed on a television screen. The apparatus includes a base and a control rod which is mounted to the base. Resistance is provided to the operator in the form of a spring which impedes movement of the control rod as to both rotary displacement and revolution about its own axis. A mechanism is provided for continuously sensing the position of the control rod and transmitting a signal reflecting that position. The exercise apparatus, in effect, emulates a large joy stick that could be used to operate a video game upon application of physical exertion.

Hall, U.S. Pat. No. 5,317,336, discloses a mouse yoke assembly for interfacing with a computer through the sensing means of a mouse to simulate the flying of a plane or driving of a vehicle. The assembly includes a housing and a control member movably supported by the housing. The housing is adopted to support a mouse thereon. Movement of the control member is sensed by the sensing mechanism of the mouse. The assembly further includes a clamping means for mounting and immobilizing the housing to a support structure.

Braeunig, U.S. Pat. No. 4,925,189, discloses a video game controller which attaches to the user's upper torso allowing the user to simulate a joy stick. The controller attaches to the user's upper back by means of straps and buckles. Changes in orientation of the upper body are detected by an array of mercury switches which convert and transmit such changes to the input of a video game. Additional controls, such as push button firing, are provided by a hand held control means.

Blair, et al., U.S. Pat. No. 4,695,953, discloses an interactive video game system which provides for repeated switching of multiple tracks of different actions of the same animated character according to the skill of the operator in contacting the camera-originated animation display. The video game comprises an ultrasonic transducer and a microphone combination which measures data and converts the signal into digital form, thereby adjusting the position of the animated character or object accordingly.

In fact, one of these controllers has been designed to resemble actual fishing equipment:

Dornbusch, U.S. Pat. No. 5,232,223, discloses an electronic game controller for controlling a fishing simulation video game. The controller consists of a rod and a reel. The reel contains electronic circuitry necessary to control the game. A plurality of position sensing switches, such as mercury switches, are mounted on a circuit board in the reel and are used to sense the position of the rod in a reel controller during game play. The mercury switches are strategically located on the circuit board to sense the orientation of the fishing rod as the rod is moved in various directions by the game player. The reel also includes a crank corresponding to an actual fishing reel crank which is used to simulate the reeling of the lure once the lure has been cast from the reel. The crank is further attached to a disc mounted inside the reel, which contains a series of spaced holes which pass between an optical source, an optical sensor or optical switch. The optical sensor senses the holes of the travel path of the optical switch causing a signal to be generated which is used to adjust the game. Finally, the reel includes a push button for selecting options of the game, a casting button to simulate casting, and two game control buttons.

Although many of the game controllers that are used to simulate activities are shaped like the actual equipment used in the activity, they do not provide feedback to the user, nor do they provide the actual "feel" of the activity to the user. Accordingly, the controllers in the prior art are not realistic in that they cannot simulate the "kickback" of a gun or the "pull" of a fish on a line.

Although the Dornbusch controller is shaped as a rod and reel, it does not provide any feedback to the user that a fish is on the line, and accordingly does not provide the realistic "feel" to the user of catching a fish. What is needed, and what has not previously been provided, is a game controller which more accurately recreates the "feel" of fishing by simulating the "pull" of a fish on a rod and reel electronic game controller held by a user. Unlike the prior art, the rod and reel electronic game controller of the present invention simulates the stress on a reel and "pull" on a rod as a user would actually experience during fishing.

OBJECTS AND SUMMARY OF THE INVENTION

It is a primary object of this invention to provide an electronic game controller that recreates the actual forces encountered by a user to simulate actual fishing.

It is also an object of this invention to provide an electronic game controller for use with a computer.

It is an additional object of this invention to provide an electronic game controller configured as a fishing rod and reel for use with an electronic fishing game.

It is another object of this invention to provide a fishing rod and reel controller that indicates the "pull" of a fish by pivoting the rod in an upward or downward motion.

It is still another object of this invention to provide a fishing rod and a reel controller that provides resistance to the rod and reel through an electric motor and gyroscope to simulate the presence of a hooked fish on the line.

It is another object of the invention to provide a fishing rod and reel controller that operates at various retrieval speeds.

It is still further another object of the invention to provide a fishing rod and reel controller with a reel handle and brake that retrieves at different tensions to simulate the "pull" of fish on the line.

It is further another object of this invention to provide a fishing rod and reel controller with switches that allows the user to set the hook and "play" the fish.

It is yet a further object of the invention to provide a fishing rod and reel controller that allows the player to select different game options by pushing buttons on the reel and handle.

It is still further another object of this invention to provide a fishing rod and reel controller that houses electronic components in the rod and reel handle.

It is still another object of the this invention to provide a fishing rod and reel controller that simulates surf casting.

It is yet a further object of this invention to provide a fishing rod and reel controller that simulates fly fishing.

It is further another object of this invention to provide a fishing rod and reel controller that simulates bass fishing.

It is still further another object of this invention to provide a fishing rod and reel controller that simulates bait casting.

It is yet another object of this invention to provide a fishing rod and reel controller that simulates spin casting.

It is still further another object of this invention to provide a fishing rod and reel controller that simulates deep sea fishing.

It is even another object of this invention to provide a fishing rod and reel controller that simulates boat fishing.

It is further another object of this invention to provide a fishing rod and reel controller that simulates trolling and big game fishing.

It is still yet another object of this invention to provide a fishing rod and reel controller that simulates a simple rod and reel for young kids.

It is further another object of this invention to provide a fishing rod and reel controller for use with a surf cast fishing game module.

It is still yet another object of this invention to provide an electronic game controller for use with a fly tying and fly fishing game module.

It is still another object of this invention to provide a fishing rod and reel controller for use with a boat fishing game module.

It is even another object of this invention to provide a fishing rod and reel controller for use with a lake fishing game module.

It is still yet another object of this invention to provide a fishing rod and reel controller for use with a deep sea fishing game module.

It is still another object of the invention to provide a fishing rod and reel controller for use by young children for simulated fishing.

It is still yet another object of this invention to provide an electronic fishing game including an endless video and audio loop to show actual fishing environments on a monitor or screen.

The fishing rod and reel electronic game controller of the present invention accomplishes these objects with a device that includes a handle, a reel attached to the handle and a rod extending from the reel. The reel houses a motor and a gyroscope which applies forces to the controller. The reel includes a crank for simulating line retrieval. A portion of the rod extends within the reel and is pivotally mounted therein. Metal plates are attached to the portion of the rod positioned within the reel. The metal plates and rod are positioned between magnets, which, when energized or de-energized, cause the rod to pivot, thereby simulating a real-life fishing condition. Additionally, the line retrieval crank operates at various speeds and tensions. Finally, the reel serves as a mouse selector controller for setting the hook and "playing" the fish.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Figure 1:
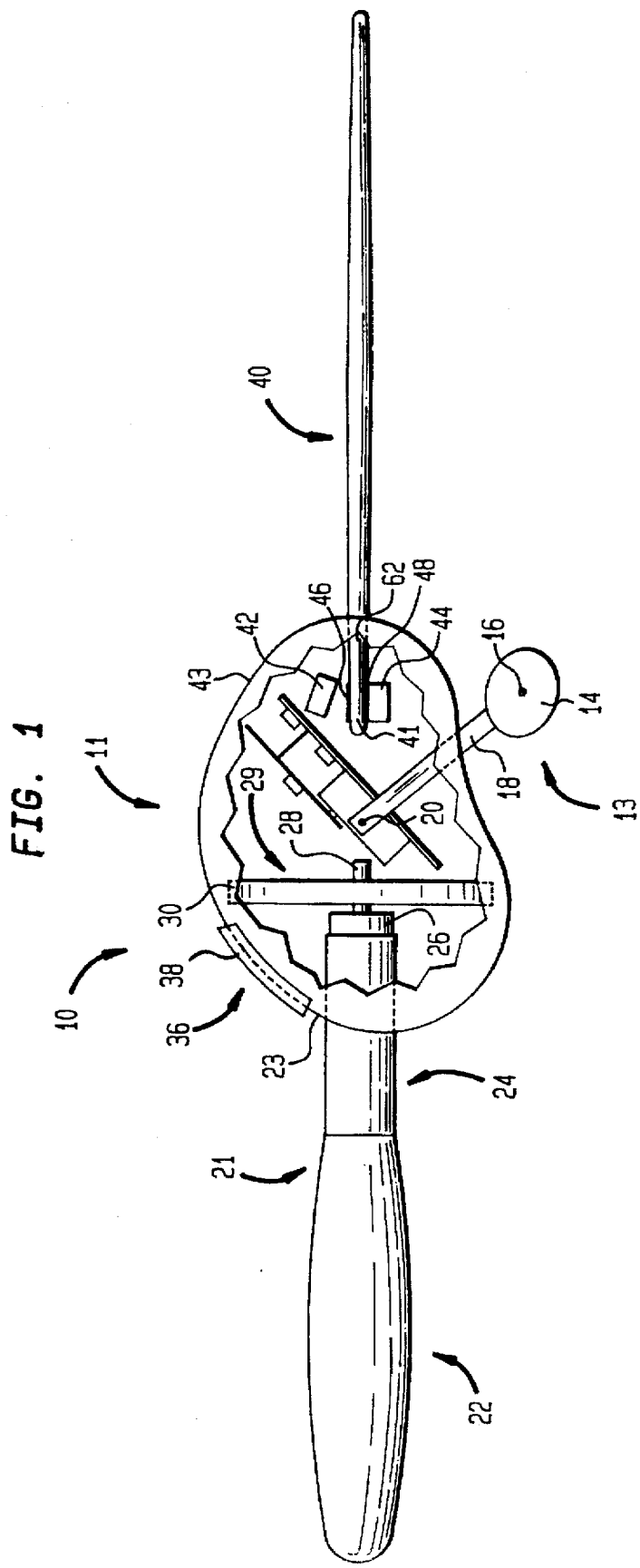
FIG. 1 is a partially cut-away side plan view of the electronic game controller of the present invention.
Figure 2:
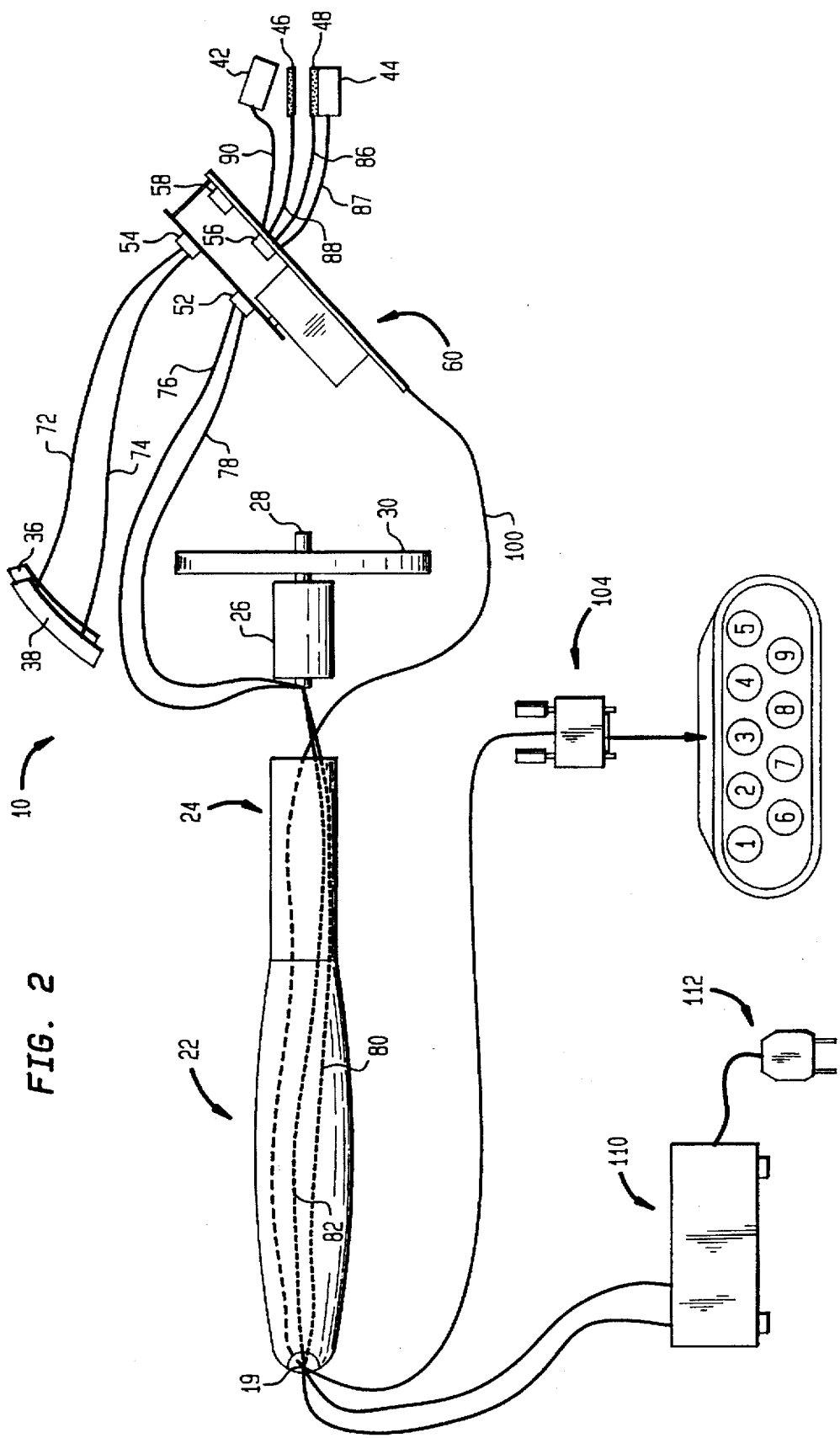
FIG. 2 is a partially cut-away top plan view of the electronic game controller shown in FIG. 1.
Figure 3:
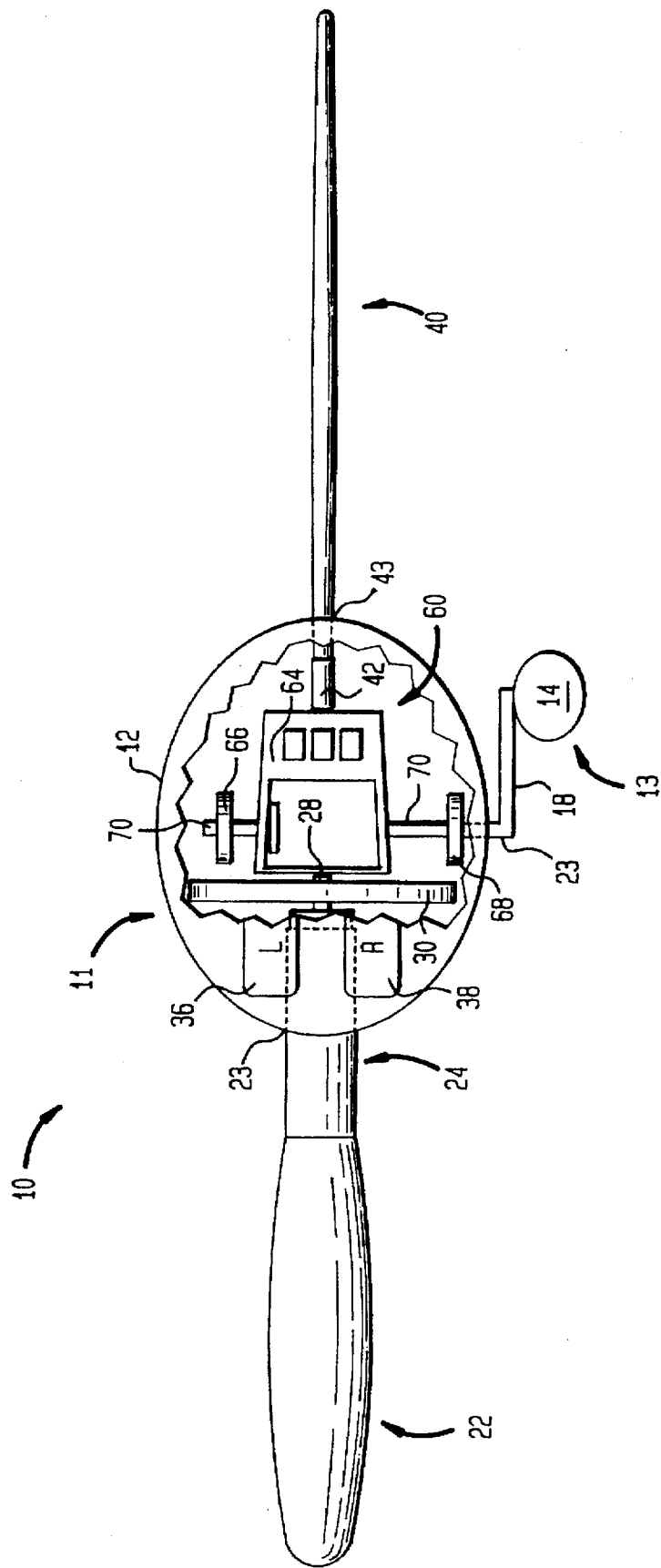
FIG. 3 is a schematic view of the electronic game controller shown in FIG. 1, interconnected with a computer.

Referring to FIGS. 1–3, the fishing rod and reel electronic game controller of the present invention, generally indicated at 10, is shown having three main components: rod handle 21, reel housing 11 and rod shaft 40, all of which are interconnected.

Rod handle 21 comprises two portions: a hollow motor mount housing 24 for receiving motor 26 at one end, and a grip portion 22 at the other end. The motor mount housing 24 and the grip portion 22 may be separately defined or of uniform construction. The grip portion 22 is designed to be held by a game player during use. The rod handle 21 is generally hollow for permitting a cable 100 to run from the motor 26 through the rod handle 21 to a computer 110 or other electronic game apparatus.

The rod handle 21 is interconnected with reel housing 11 by means of a portion of motor mount 24 inserted into mount aperture 23 of reel housing 11 and secured therein by any means known in the art. Thus, the motor 26 extends from the motor mount housing 24 of the rod handle 21, within the reel housing 11.

The reel housing 11 extends about a gyroscope means which is supported and powered by the motor 26 for exerting forces on the reel housing 11. A gyroscope wheel 30 is centrally mounted to gyroscope axle 28 which is interconnected with the motor 26. Other means of affecting the controller are also within the scope of the present invention.

The reel housing 11 also houses the logic components of the fishing rod and reel electronic game controller. Referring to FIGS. 2 and 3, circuit control board 60 is positioned centrally within reel 11. The control board 60 comprises a plurality of microprocessors including: engine microprocessor 52 which is coupled to motor 26 by wires 76 and 78; switch microprocessor 54 which is coupled to left and right control buttons 36 and 38, by wires 72 and 74, respectively; magnet and metal plate microprocessor 56 which is coupled to top and bottom magnets 42 and 44, by wires 90 and 87, respectively, and to top and bottom metal plates 46 and 48, by wires 88 and 86, respectively; and brake microprocessor 58 which is coupled to brake 64.

Referring to FIGS. 1 and 3, a reel crank 13 extends from aperture 23 located centrally on the side of reel housing 11 and includes reel crank roller 14, reel crank shaft 18 and reel crank rod 70. The crank rod 70 is supported by left and right crank rod supports 66 and 68, respectively, within the reel housing 11, and is connected with reel crank shaft 18 by crank shaft pin 20. Reel crank roller 14 is rotatably secured to the opposite end of reel crank shaft 18 by reel crank pin 16. The reel crank roller 14 is grasped by a game player during operation and is used to simulate reeling the fishing line.

Referring to FIG. 3, brake 64 is movably secured to crank rod 70 and is electronically interconnected with control circuit board 60 to apply variable resistance to the crank rod 70 to make it easier or more difficult to turn. The brake 64 is thus simulates the "pull" and resistance of a fish on a fishing line.

The third main component of the fishing rod and reel electronic game controller, rod shaft 40, extends from reel housing 11, through shaft aperture 43, as shown in FIGS. 1 and 3. Rod shaft 40 is pivotally secured to and within reel housing 11 by rod connecting pin 62. Rear portion 41 of rod shaft 40 extends rearward of pin 62 within the reel housing 11. Top and bottom metal plates 46 and 48, respectively, are attached to the top and bottom of the rear portion 41 of rod shaft 40. Top and bottom rod magnets 42 and 44, respectively, are positioned within the reel housing 11 above and below the top and bottom metal plates 46 and 48, respectively, to cooperate with top and bottom metal plates 46 and 48, respectively. The top and bottom magnets 42 and 44 may be selectively activated to attract the top and bottom metal plates 46 and 48. This causes the metal plates to move towards the activated magnet, which in turn pulls the rod shaft towards the activated magnet by pivoting about connecting pin 62. Alternatively, one metal plate could be attached to the rod shaft and one magnet positioned to coact with the metal plate to attract or repel the metal plate to cause the rod shaft to pivot. Other configurations known in the art could be employed.

As shown schematically, in FIG. 2, interconnecting the circuit control board 60 within reel housing 11 with the computer or electronic game apparatus is communication cable 100 which extends from the reel housing 11, through the rod handle 21, and through aperture 19 at one end of grip portion 22. Alternatively, such interconnection may be made in any other suitable manner. Communication cable 100 interfaces with the computer or electronic game apparatus by means of communication plug 104. Wires 80, 82 connect motor 26 to a power source such as a 6 volt to 120 volt converter 110, or any other suitable power source, which can be connected to power by plug The embodiment of the fishing rod and reel electronic game controller, as shown in FIGS. 1-3, is used in connection with an electronic game to simulate an actual fishing experience. The electronic game controller is connected to a computer or other electronic game unit which operates the electronic fishing game.

The basic fishing rod and reel electronic game controller operates as follows:

The player holds the grip portion 22 of the rod handle 21 with one hand and casts the rod and reel 10 in the manner that one would actually cast if actually fishing. The computer simulates the results of the cast and on a monitor shows a location to which the player has cast. The player then retrieves the fishing line by reeling the reel crank The player can adjust the line retrieval speed with the electronic controller. This experience may be simulated by the computer which would show, on the monitor, a line being reeled in by a miniature person. The background on the monitor could be provided by looping a video of a fishing environment in the background.

Upon indication from the computer that a "fish" is on the line, several features of the rod and reel electronic game controller are activated thereby providing realistic feedback to the player simulating a fish is on the line. For example, microprocessor 52 actuates motor 26 which rotates gyroscope axle 28 and gyroscope wheel 30. Accordingly, such rotation produces perpendicular forces in the electronic rod and reel game controller to simulate the "pull" of an actual fish. In addition, the computer can vary the force of this "pull" depending on the size and strength of the simulated "fish." If the fish "gets away" the computer indicates that the "fish" is no longer "hooked," and the motor and gyroscope stop to thereby stop the forces applied to the controller.

The fishing rod and reel electronic game controller also provides feedback to the player to simulate fishing by pivoting rod shaft 40 in an upward or downward direction to simulate the feel of a "fish" on the line. In order to pivot rod shaft 40 microprocessor 56 energizes top magnet 42, thereby attracting top metal plate 46 attached to the end 41 of rod shaft 40 to pivot the rod shaft 41 about rod connecting pin 62, thereby dipping rod 40 to simulate the feel of a fish on a line. If the fish gets away, bottom magnet 44 is energized, thereby attracting bottom metal plate 48 to return rod 40 shaft back to a horizontal position.

The fishing rod and reel electronic game controller contains several other features to further aid in simulating an actual fishing expedition. First, reel crank 13 may operate at various retrieval speeds in accordance with the logic controls of the rod and reel electronic game controller, as do actual fishing reels. Further, brake 64 may be employed to provide various degrees of resistance to reel handle 22 to simulate the "pull" of a fish that occurs during reeling in a fish. To simulate a fish on the line, brake 64 applies pressure to crank rod 70 which increases force on reel crank 13, providing resistance to reeling in the line. This force is automatically increased or decreased depending upon the specifications of the computer or the electronic game apparatus.

Finally, the embodiment shown in FIG. 1-3 is equipped with left and right buttons 36 and 38 for "setting the hook" and "playing the fish." These buttons may also be used to select game options or to control other operations.

The fishing rod and reel electronic game controller is designed to simulate various types of fishing equipment for various fishing experiences. The fishing rod and reel electronic game controller may be used in conjunction with various modules that are or may be designed and constructed for creating various fishing simulations. Such modules could be received by the computer or game apparatus to provide simulations for various type of fishing and/or various locations for fishing. For example, a module could include surf casting on famous beaches of the world. As an add-on to such a module, various locations could be created including Nantucket Island, Mass., Martha's Vineyard, Mass., Cape Cod, Mass. Another module could include fly fishing on famous rivers of the world and fly tieing with add-ons such as the Black Foot River in Montana, the Roman Lake in Ontario and the Lake of Woods in Wildwood Minnesota. A still further example of a module could be boat fishing on famous lakes of the world, and including Lake Okeechobee, Fla., Lake Fork, Tex., Kawai, and Hawaii. Another subject for a module could be deep sea fishing in such add-on locations including Cannes, Australia, Kona, Hawaii, and Venezuela. Other possibilities for modules and/or add-ons are considered within the scope of the present invention.

In accordance with these fishing environments, the fishing rod and reel electronic game controller can simulate a variety of fishing rods and reels for a given environment, including a fly fishing rod and reel, a bait cast rod and reel, a spinning rod and reel, a surf cast rod and reel, a bass rod and reel, an ocean rod and reel, a boat rod and reel, and a child's rod and reel.

The fly fishing rod and reel for example, could operate as follows: An imaginary fly line extends from rod shaft 40 and reel housing 11. Magnets 42 and 44 and metal plates 36 and 48 mounted on the rod shaft 40 coact to cause rod shaft 40 to pivot back and forth between magnets 42 and 44 to simulate the player casting a fly rod. Actuation of mouse buttons 36 or 38 could further allow the player to spool the imaginary line from the controller. Finally, the hook can be set and the fish retrieved as described above.

The graphic accuracy of the present invention is obtained from morphing live digital and video animation of various ocean, river, beach and lake scenes that are looped into three to five minute sections with the last frame of the video then morphed back into the first frame. These scenes are then layered with the appropriate loops of digital sound for each area. Accordingly, the user experiences a sense of being at that particular ocean, beach, lake or river location.

During operation of the fishing electronic game, an animated fisherman is superimposed on the morphed projection to appear to be fishing. The fisherman is controlled by the electronic game controller and appears to be a real person casting a fishing rod, though slightly delayed. Lines, lures, fish, weather conditions and other miscellaneous items are computer generated. For example, the weather is a graphic animation layered over background skyline. There is also a pop-up menu that allows for the user to choices as the game progresses.

The programs are designed to duplicate true fishing conditions. Fish are represented by a single pixel or group of pixels depending on the size of the fish. These fish or pixels move in true relationship to their natural environment and underneath the visual setting that appears on the screen. The environment is based on the true depth and topography maps for each fishing area. Fish movement is based on feeding habits, weather changes, temperatures, depths, and other situations that affect each species in each environment.

Further, strike zones are provided to increase the skill level and realism of the game. Strike zones are represented as rings that surround the fish. These rings expand or contract with water temperature, tides or any other changes in environment. These strike zones determine whether or not a fish will strike. Once a ring is crossed by a lure, a fish can respond in one of several ways. First, if the lure passes through the active strike zone then the retrieve rate of the lure and its color will be the deciding factors of whether the fish strikes. If the strike zone is crossed, the fish will hit the lure. If the required conditions are not met, however, the fish will not bite. It is possible that a fish will hit the lure, stray, then come back to hit the lure again. Finally, big fish have the smaller strike zones than small fish and must be hit directly in order for a catch. Accordingly, the fishing rod and reel electronic game controller of the present invention, along with the software, makes for an extremely accurate and realistic fishing experience.

Modifications of the foregoing may be made without departing from the spirit and scope of the invention. What is desired to be protected by Letters Patents is set forth in the appended claims.

What is claimed is:

1. An electronic controller for fishing simulation electronic games, comprising:
   a housing;
   a reel enclosed within said housing;
   a handle connected to said reel;
   means connected to said handle for applying variable resistance to said handle; and
   microprocessor means connected to said handle for controlling the resistance applied to said handle.

2. An electronic game controller apparatus for a fishing simulation electronic game, comprising:
   a housing;
   a reel enclosed within said housing;
   force exerting means in said housing for moving said reel; and
   control means connected to said force exerting means for controlling the amount of movement of said reel.

3. The apparatus of claim 2, wherein said force exerting means includes a gyroscope.

4. The apparatus of claim 3, wherein said gyroscope is disposed at the center of the interior of the housing.

5. The apparatus of claim 4 further including an electrical motor connected to said gyroscope.

6. The apparatus of claim 5, further including crank means extending from said housing for simulating the reeling in of a fishing line.

7. The apparatus of claim 6, further including resistance means connected to said crank means for applying resistive force to said crank means for simulating resistance on a fishing line.

8. The apparatus of claim 7, further including microprocessor means connected to said gyroscope, said electrical motor, said crank means and said resistance means for simulating the forces on said housing to represent a fishing rod and reel.

9. An electronic computer game controller for simulating a fishing rod and reel comprising:
   a rod handle and a rod shaft for simulating a fishing rod;
   a reel attached to said rod handle for simulating a fishing reel;
   gyroscope means for producing forces on said reel, said rod handle and said rod shaft; electrical motor means connected to said gyroscope means for operating said gyroscope means;
   reel handle means attached to said reel for simulating a fishing reel handle;
   brake means attached to said reel handle means for applying resistance to said reel handle means;
   pivoting means connected to said rod shaft for pivoting said shaft;
   and microprocessor controller means connected to and controlling said electrical motor means, said brake means and said pivoting means for simulating fishing.

* * * * *